United States Patent [19]
Uesugi

[11] 3,862,797
[45] Jan. 28, 1975

[54] SHIFTING DEVICE FOR COMPENSATING IMAGE PERFORMANCE OF PHOTOGRAPHIC CAMERA LENS IN CLOSE-UP PHOTOGRAPHING

[75] Inventor: Kyozo Uesugi, Izumi, Japan

[73] Assignee: Minolta Camera Kabushiki Kaisha, Osaka, Japan

[22] Filed: July 23, 1973

[21] Appl. No.: 381,660

[30] Foreign Application Priority Data

Aug. 7, 1972 Japan .............................. 47-92617

[52] U.S. Cl. .................... 350/255, 350/47, 350/184
[51] Int. Cl. ........................................ G02b 7/02
[58] Field of Search ........................ 350/245–257, 350/184, 46, 47

[56] References Cited

UNITED STATES PATENTS 3,663,093 5/1972 Iida .................................. 350/255
3,773,405 11/1973 Sugano .............................. 350/255

*Primary Examiner*—Ronald L. Wibert
*Assistant Examiner*—Michael J. Tokar
*Attorney, Agent, or Firm*—Wolder & Gross

[57] ABSTRACT

This shifting device comprises a photographic lens system which is made up of a front lens element fixedly held by a focusing ring, a rear lens element fixedly held by an inner tube, and a floating space variable by shifting. The focusing ring is threadedly fitted over an outer tube through shifting means. The inner tube is engaged with the focusing ring through the shifting means and with the outer tube through straightforward movement controlling means. The focusing ring is slidably and rotatably fitted over the inner tube through sleeve fit.

5 Claims, 1 Drawing Figure

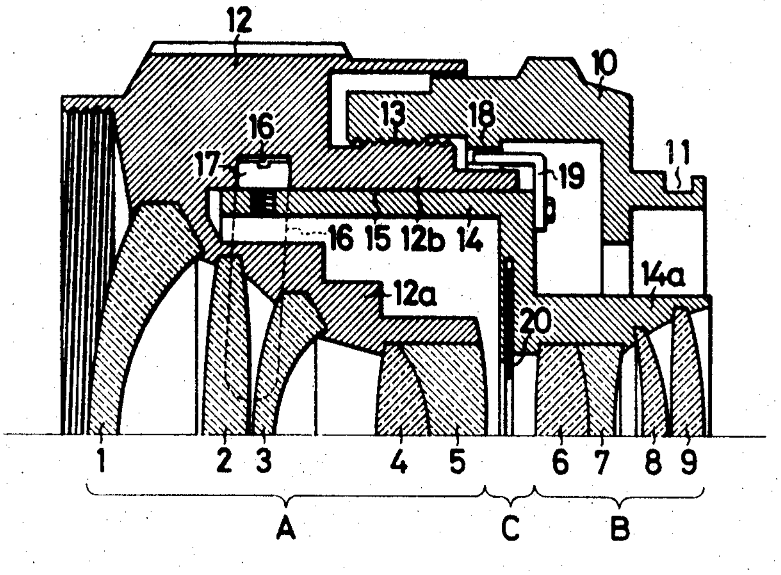

SHIFTING DEVICE FOR COMPENSATING IMAGE PERFORMANCE OF PHOTOGRAPHIC CAMERA LENS IN CLOSE-UP PHOTOGRAPHING

BACKGROUND OF THE INVENTION

This invention relates to a shifting device for compensating an imaging performance of a photographic camera lens in close-up photographing and more particularly to a shifting device for compensating an imaging performance of a photographic camera lens of the total shifting type in close-up photographing wherein focusing is adjusted by shifting the total lens system which is divided into front and rear elements.

In a recent type camera there is a strong tendency toward an increase in a maximum close-up focusing performance but in a retrofocus type lens there is a particularly marked reduction in imaging performance caused by shifting of the lens elements, which fact has posed an important problem for improvement in the performance of a lens.

As a means to solve this problem are known U.S. Pat. No. 2,539,894 to F. E. Altman and U.S. Pat. No. 2,046,261 to Hasegawa, but according to the patents, a method of dividing a lens system into front and rear elements and making the amount of displacement between the two elements differently is employed, and as a means of shifting the two elements in different amounts are required not only three pairs of helicoid screws or equivalents thereto in all, namely two pairs of helcoid screws or equivalents thereto for moving a diaphragm portion straightforwardly so as to be suited to an automatic diaphragm and a pair of helicoid screws or equivalents thereto for compensationally shifting a lens system (making the front and rear elements different in the amount of shifting), but also at least two pairs of straightforward movement controlling means.

In this manner each helicoid screw that functions as shifting each lens has much to do in its accuracy with lens performance, imaging characteristic and operatability. Accordingly, high precision machine tools have heretofore been used for machining the helicoid screws and also a large number of machining steps have been used, which fact has conspired to raise the cost of machining substantially. Namely, it is not desirable to increase the helicoid screws even one pair larger in number than those in the conventional retrofocus type lens.

Furthermore, arrangement of straightforward movement controlling means, an increase in the number of helicoid screws, and the like make the shapes of members complicated and increase the number of parts and the number of steps of assembling the parts, thereby substantially increasing the cost of a photographic lens and also arresting a tendency toward making interchangeable lenses lighter in weight and more compact.

In an attempt to eliminate the disadvantages of the kind described, the structure of a photographic lens simplified by subtracting one pair of helicoid screws or equivalents thereto and the number of parts from those of the conventional structure of the lens system was suggested by S. Sugano in his U.S. Pat. No. 3,773,405 granted Nov. 20, 1973.

But this proposed improvement is not necessarily esentially different in that the accuracy of finishing of helicoid screws must be strictly controlled, and in point of cost the improvement has reduced the cost equivalent to the amount saved by reduction in the number of helicoid screws. Since the photographic lens always projects from the front of the camera body and is supported, due consideration must be given to possible shock against the lens, but it is very difficult to maintain the high precision of the type described over a long period of time, and there are problems remaining yet to be solved in point of reliability, quality, etc.

SUMMARY OF THE INVENTION

A primary object of this invention is to provide an improvement over the Sugano patent previously referred to and to facilitate machining of helicoid screws or equivalents thereto in a substantial degree.

Another object of this invention is to prevent centering errors in the form of parallel deviation and tilt between the front and rear lens elements consequent upon the shifting of the lens elements and to attain axial alignment of the optical system in an easy and simple manner.

Still another object of this invention is to provide a photographic camera lens free from the centering errors described and which is stabilized in optical performance and higher in reliability.

With the described objects in view, this invention is of the construction in which one of those two lens element groups into which the photographic lens system is divided, namely a front lens element is held by a focusing ring adapted to be rotated for focusing and said focusing ring is brought into threaded engagement with an outer tube of lenses through one pair of helicoid screws as shifting means so as to move the front lens element back and forth through the helicoid screws while the element is being rotated by focusing operation and in which an inner tube holding the other lens element, namely a rear lens element is fitted into said focusing ring through sleeve fit and is engaged with the focusing ring shifting means such as a cam and is further brought into engagement with the outer tube through straightforward movement controlling means.

According to the invention, the number of helicoid screws required is only one pair of helicoid screws that provide threaded engagement between the focusing ring and the outer tube, and even if helicoid screws are used in the shifting means, the helicoid screws used do not exceed two pairs in number and it is only necessary to provide only one pair of straightforward movement controlling means between the outer tube and the inner tube. The focusing ring and the inner tube are enabled to be free from the centering errors consequent upon lens shifting in that the respective optical axes of the front lens element and the rear lens element are always brought into exact alignment with each other without being influenced even by rotation of the focusing ring.

Accordingly, there is no necessity of especially rigid control over the accuracy of finishing of the helicoid screws, and the essential point is to see to it that the focusing operation is smoothly carried out and that the focusing ring is positively held by the outer tube and the helicoid screws can bear load and shock from a conceivably possible degree of outer force.

Also, the sleeve fit portion described can be finished easily and accurately by a normal cylinder grinding method.

Other objects and features of the invention will become more apparent from a description of the following embodiment of the invention taken in conjunction with the accompanying drawing.

BRIEF DESCRIPTION OF THE DRAWING

The drawing is a longitudinal sectional view of an embodiment of this invention with the half part of the embodiment omitted.

DESCRIPTION OF THE PREFERRED EMBODIMENT

In the drawing, the numerals 1 to 9 respectively designate lenses making up an optical system of photographic lenses, and the embodiment of the device illustrated is designed to compensate an imaging performance in close-up photographing by varying the air space between a lens 5 and a lens 6 in proportion to shifting. But this air space is not limited to the air space shown in the embodiment, and other spaces or the thickness, etc., of other parts may be varied.

In the embodiment shown, for convenience' sake, an optical system made up of lenses 1 to 5 is called a front lens element A, and an optical system made up of lenses 6 to 9 is called a rear lens element B, and the air space that is varied in accordance with shifting of the distance between the lenses 5 and 6 is called a floating space C.

The numeral 10 designates an outer tube, which is a lens barrel fixed to a camera body (not shown) and which is provided with a mount 11 for the camera body.

A focusing ring 12 adapted to be rotated in focusing operation is brought by a pair of helicoid screws 13 into threaded engagement with said outer tube 10, and moves back and forth by the rotation in focusing operation. Also, the ring 12 has inside a front lens element holding frame 12*a* formed integral therewith so as to fix a front lens element A to the frame 12*a* and, as described, is adapted to reciprocate the front lens element A by the rotation in focusing operation. An inner tube 14 having a rear lens element B fixed to the integral holding frame 14*a* is fitted over a tube portion 12*b* of the focusing ring 12 slidably and rotatably without play through sleeve fit 15 so as to bring the optical axis of the front lens group A into alignment with that of the rear lens group B.

In one part of the inner periphery of the tube portion 12*b* of the focusing ring 12 is formed a lead groove 16 having a cam action as shown, and a pin 17 protrudingly formed on the periphery of the inner tube 14 is engaged in the lead groove 16 to bring the inner tube 14 into engagement with the focusing ring 12. Namely, engagement of the pin 17 with the lead groove 16 is provided as a compensational shifting means and this means may be provided by meshing between helicoid screws of suitable pitches. Also, in order to make the effect of this shifting more proper, the shifting may be provided in a camlike mechanism other than the lead groove. Also, to the inner tube 14 is fixed a key 19 that engages with a keyway 18 formed on the outer tube 10 parallelly to the central axis of the tube 10, said key 19 being adapted to move the rear lens element B back and forth in accordance with the leads formed in combination by the helicoid screws 13 and lead 16 without causing even the rotation of the focusing ring 12 to turn the inner tube. This straightforward movement of the inner tube 14 is useful for mounting an automatic diaphragm means and the like without difficulty, for example in interchangeable lenses for use with a single lens reflex camera.

The numeral 20 designates an iris diaphragm which is held by the inner tube 14 in the embodiment shown. Rotation of the focusing ring 12 shifts the front lens element A and the rear lens element B simultaneously through helicoid screws 13 and the compensational shifting means made up of lead groove 16 and pin 17, and the rate of amount shifted can be optionally set by the leads of helicoid screws and of lead groove 16, and the respective shifting amounts of the front and rear lens elements can be related with each other by a combination of both leads of the helicoid screws and the groove.

Accordingly, a rate of speed $\rho$ in displacement between the front lens element A and the rear lens element B with respect to a film surface can be expressed by $\rho$ = (speed of front lens element)/(speed of rear lens element) = (lead of helicoid screw)/[(lead of helicoid screw) − (lead of lead groove)]

and floating space C varies in accordance with said $\rho$.

Also, the sleeve fit 15 portion can be given exceedingly high precision machining by a very commonplace and simple means as by cylindrically grinding the sleeve fit portion, which precise machining is highly conducive toward reliability, improvement and stabilization of quality. Also, the inner tube is positioned inside of the outer tube, and due consideration is given to the inner tube so as to be free from load due to outer force and to have sufficient vibration and shock resisting properties imparted thereto.

What is claimed is:

1. A photographic lens for a camera comprising: a photographic optical lens system consisting of a front lens group and a rear lens group and an air space variable by displacement between said front lens group and said rear lens group, an outer tube including means for securing said photographic lens to a camera body, a focusing ring rotatably and axially shiftably engaging said outer tube for focusing and shifting means including a pair of matingly engaging helicoid screws formed in the inner periphery of said outer tube and the confronting face of the focusing ring, said ring fixedly holding the front lens group of said photographic optical lens system, an inner tube engaged with said focusing ring through a compensational shifting means including a cam groove formed in the inner periphery of said focusing ring and a pin projecting from said inner tube and engaging cam groove and means for restricting said inner tube to axial movement relative to said outer tube and said inner tube being adapted to be displaced by said focusing operation, said inner tube fixedly holding the rear lens group of the photographic optical lens system and being fitted slidably and rotatably in said focusing ring through a sleeve fit.

2. A camera photographic objective lens comprising a rear barrel section (10) having a rear coupling portion (11) for mounting the objective lens, a front barrel section (12) coaxial with and forward of said rear barrel section said front and rear barrel sections having mating helicoidal threads (13) coaxial with said barrel whereby relative rotation of said front and rear barrel sections effects relative axial movement between said barrel sections, a front lens group (A) mounted in and movable with said front barrel section, and inner barrel section (14) at least partially telescoping said front barrel section, said front and inner barrel sections having relatively rotatably and axially engaging coaxial cylindrical faces (15), a rear lens group mounted in said inner barrel and separated from said front lens group by a floating space (C), said front barrel section having formed in the inner face thereof a peripherally and axially extending cam groove (16), a follower (17) mounted on said inner barrel section and slidably engaging said cam groove and means (18, 19) relatively movably intercoupling said rear and inner barrel sections for restricting the rotation of said inner barrel section relative to said rear barrel section and permitting relative axial movement therebetween.

3. The lens of claim 2 wherein said coupling means includes a key member (19) fixed to said inner barrel section slidably engaging a longitudinally extending keyway (18) formed in said rear barrel section.

4. The lens of claim 3 wherein said follower includes a cylindrical member projecting radially outwardly from said inner barrel section into registry with said cam groove.

5. The lens of claim 4 wherein said helicoidal threads are formed on an inside peripheral face of said rear barrel section and an outwardly facing surface of said front barrel section.

* * * * *